United States Patent
Dellock et al.

(10) Patent No.: US 10,499,017 B2
(45) Date of Patent: Dec. 3, 2019

(54) REAR CAMERA WITH DEFROSTER AND EMBEDDED PROXIMITY SWITCH

(71) Applicant: Ford Global Technologies, LLC, Dearborn, MI (US)

(72) Inventors: Paul Kenneth Dellock, Northville, MI (US); Pietro Buttolo, Dearborn Heights, MI (US); Stuart C. Salter, White Lake, MI (US); Aaron Bradley Johnson, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 129 days.

(21) Appl. No.: 15/598,286

(22) Filed: May 17, 2017

(65) Prior Publication Data
US 2018/0338118 A1 Nov. 22, 2018

(51) Int. Cl.
| | | |
|---|---|---|
| *B60R 1/00* | (2006.01) | |
| *H04N 7/18* | (2006.01) | |
| *B60S 1/02* | (2006.01) | |
| *G02B 1/10* | (2015.01) | |
| *G02B 27/00* | (2006.01) | |
| *B60S 1/56* | (2006.01) | |
| *B60R 11/04* | (2006.01) | |
| *B60R 11/00* | (2006.01) | |

(52) U.S. Cl.
CPC ............... *H04N 7/183* (2013.01); *B60R 1/00* (2013.01); *B60R 11/04* (2013.01); *B60S 1/026* (2013.01); *B60S 1/56* (2013.01); *G02B 1/10* (2013.01); *G02B 27/0006* (2013.01); *B60K 2370/152* (2019.05); *B60K 2370/173* (2019.05); *B60K 2370/21* (2019.05); *B60K 2370/35* (2019.05); *B60R 2011/004* (2013.01); *B60R 2300/207* (2013.01); *B60R 2300/806* (2013.01)

(58) Field of Classification Search
CPC ........... H04N 7/183; B60R 1/00; B60S 1/026; G02B 1/10; G02B 27/0006
USPC .......................................................... 348/148
See application file for complete search history.

(56) References Cited

U.S. PATENT DOCUMENTS

| | | | | |
|---|---|---|---|---|
| 4,355,861 | A | * 10/1982 | Sebald | ................. H04N 5/2251 219/201 |
| 4,957,358 | A | 9/1990 | Terada et al. | |
| 5,703,352 | A | * 12/1997 | Snoeren | ............... H04N 5/2253 250/208.1 |

(Continued)

FOREIGN PATENT DOCUMENTS

WO    WO 2009031130 A1    3/2009

OTHER PUBLICATIONS

Search Report dated Oct. 16, 2018 for GB Patent Application No. GB 1807901.2 (5 pages).

*Primary Examiner* — William C Vaughn, Jr.
*Assistant Examiner* — Jae N Noh
(74) *Attorney, Agent, or Firm* — Frank Lollo; Eversheds Sutherland (US) LLP

(57) ABSTRACT

Method and apparatus are disclosed for operating a rear camera with an embedded defroster and proximity switch. An example vehicle includes a rear view camera having a lens, an indium-tin-oxide (ITO) coating applied to the lens, and a control system. The control system is configured to detect a water-based obstruction on the lens, run current through the ITO coating to remove the water-based obstruction, detect a lens touch event, and release a vehicle trunk latch responsive to the lens touch event.

16 Claims, 6 Drawing Sheets

(56) References Cited

U.S. PATENT DOCUMENTS

| | | |
|---|---|---|
| 6,498,970 B2 | 12/2002 | Colmenarez et al. |
| 9,095,010 B2 | 7/2015 | Kuriki |
| 9,401,379 B2 | 7/2016 | Rohde et al. |
| 2003/0216817 A1 | 11/2003 | Pudney |
| 2007/0089527 A1 | 4/2007 | Shank et al. |
| 2011/0057773 A1 | 3/2011 | Newman et al. |
| 2011/0115972 A1 | 5/2011 | Voges |
| 2012/0314348 A1* | 12/2012 | Moncrieff ............ H05K 5/0017 361/679.01 |
| 2013/0249375 A1* | 9/2013 | Panagotacos ...... H05B 33/0803 313/13 |
| 2016/0107571 A1 | 4/2016 | Dellock et al. |
| 2016/0200264 A1 | 7/2016 | Bingle et al. |
| 2018/0210321 A1* | 7/2018 | Du ........................ G03B 17/55 |

* cited by examiner

REAR CAMERA WITH DEFROSTER AND EMBEDDED PROXIMITY SWITCH

TECHNICAL FIELD

The present disclosure generally relates to vehicle rear-view cameras and, more specifically, a rear-view camera with an embedded defroster and proximity switch.

BACKGROUND

Modern vehicles may include one or more cameras that display images through a vehicle display. One such camera may be a rear-view camera or backup camera, which allows the vehicle display to show an area behind the vehicle. Varying environmental conditions can cause the camera to be blurred or otherwise obstructed. Vehicles may also include a rear latch for a trunk of the vehicle, which may be opened in response to a user engaging a button.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown describing systems, apparatuses, and methods in which a rear-view camera can sense a touch, sense an obstruction, and clear the obstruction. An example disclosed vehicle includes a rear view camera having a lens. The vehicle also includes an indium-tin-oxide (ITO) coating applied to the lens. The vehicle further includes a control system configured to detect a water-based obstruction on the lens, and run current through the ITO coating to remove the water-based obstruction. The control system is also configured to detect a lens touch event and release a vehicle trunk latch responsive to the lens touch event.

An example disclosed method includes detecting a water-based obstruction on a lens of a rear view camera of a vehicle. The method also includes running current through an indium-tin-oxide (ITO) coating applied to the lens to remove the water-based obstruction. The method further includes detecting, via the ITO coating, a lens touch event. And the method yet further includes releasing a vehicle trunk latch responsive to detecting the lens touch event.

A third example may include means for detecting a water-based obstruction on a lens of a rear view camera of a vehicle. The example may also include means for running current through an indium-tin-oxide (ITO) coating applied to the lens to remove the water-based obstruction. The example may further include means for detecting, via the ITO coating, a lens touch event, and means for releasing a vehicle trunk latch responsive to detecting the lens touch event.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
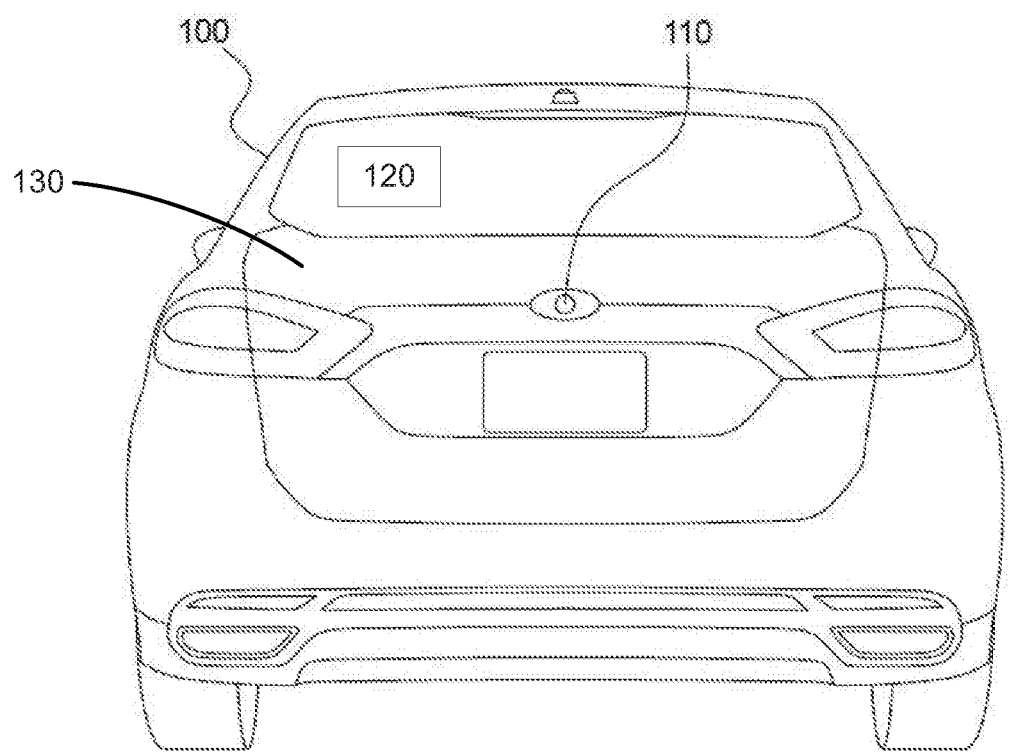
FIG. 1 illustrates an example rear perspective view of a vehicle according to embodiments of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, vehicles can include one or more cameras that may provide images of the vehicle surroundings. In particular, a rear view camera may be used to provide a driver with a view behind the vehicle, which may be useful for detecting objects that may obstruct the vehicle. This camera may be used when the vehicle is in a reverse gear, to assist the driver in backing up, parking, or otherwise moving the vehicle.

In some environments, weather conditions may adversely affect the camera. For instance, rain, snow, ice, and other precipitation or water-based conditions can block the lens of the camera, causing the displayed image to be fuzzy, blurred, or even completely obstructed. In many cases, a vehicle screen or display does not show the image from the rear view camera until the vehicle has entered a reverse gear. As such, the driver may have already entered a reversing maneuver before he or she realizes that the camera is obstructed.

Examples herein may enable a system to detect when an obstruction is present on a lens of the rear view camera, and responsively remove the obstruction. The camera may include a coating configured to heat the lens, thereby removing fog, condensation, snow, or ice from the lens. The coating may include two electrodes, positioned such that running a current through the electrodes heats the lens. In this configuration, the electrodes may also act as a sensor, providing a signal to a processor. The signal level may change based on the type of obstruction. For instance, ice on the lens may cause the signal to be higher than when condensation is present on the lens. Further, the coating may enable the system to sense when a person has touched the lens. In this manner, the lens may also act as a touch-sensor for a trunk latch of the vehicle.

In order to provide the functionality described herein, example vehicles of the present disclosure may include a rear view camera with a lens, and an indium-tin-oxide (ITO) coating applied to the lens. The ITO coating may take a particular shape in order to cover a larger portion of the lens, and may include two or more elements (e.g., electrodes). The ITO coating may be on an inside surface of the lens, such that it is protected from the outside elements but still able to heat the lens to remove one or more obstructions.

The example vehicle may also include a control system, configured to receive signals from the ITO coating to detect one or more objects on the lens (e.g., obstructions or a user's finger), and to provide current to the ITO coating to heat the lens to remove any obstructions. To that end, the control system may operate in two states, wherein the first state enables the control system to receive signals from the ITO coating. The received signals may enable the control system to determine whether there is an obstruction, the type of obstruction, and whether a user has attempted to open the trunk by touching the lens (i.e., a "touch event"). The control system may then switch to a second state, in which current is passed through the ITO coating, and the lens is heated. The heat may remove the obstruction by melting the snow/ice or defogging the lens where there is condensation.

The example system described above may enable the lens to (1) detect and remove obstructions, and (2) act as a touch sensor for the trunk, all in a single compact package. The system may reduce costs and provide greater safety and usability of the rear camera.

FIG. 1 illustrates an example vehicle 100 according embodiments of the present disclosure. Vehicle 100 may be a standard gasoline powered vehicle, a hybrid vehicle, an electric vehicle, a fuel cell vehicle, or any other mobility implement type of vehicle. Vehicle 100 may be non-autonomous, semi-autonomous, or autonomous. Vehicle 100 includes parts related to mobility, such as a powertrain with an engine, a transmission, a suspension, a driveshaft, and/or wheels, etc. In the illustrated example, vehicle 100 may include one or more electronic components (described below with respect to FIG. 2).

As shown in FIG. 1, vehicle 100 may include a rear view camera 110, communicatively coupled to a control system 120. Camera 110 may be configured to capture images to be displayed on a display of vehicle 100, which may include a center console display, an instrument panel display, a display on a vehicle rear-view mirror, a hand held device display, or some other display. In some examples, camera 110 may include a lens, one or more filters, and an ITO coating, as discussed below with respect to FIGS. 3 and 4.

Control system 120 may include one or more processors, memory, and other components configured to carry out one or more functions, acts, steps, blocks, or methods described herein. Control system 120 may be separate from or integrated with one or more other systems of vehicle 100.

In some examples, control system 120 may be configured for controlling the camera 110, trunk 130 (and/or trunk latch), and one or more other systems of vehicle 100. As mentioned above, the camera lens may be obstructed. Control system 120 may be configured to detect the obstruction, and control camera 110 to remove the obstruction. Further, in some examples control system 120 may be configured to detect a touch event on the lens of camera 110, and responsively control trunk 130 of vehicle 100.

Figure 2:
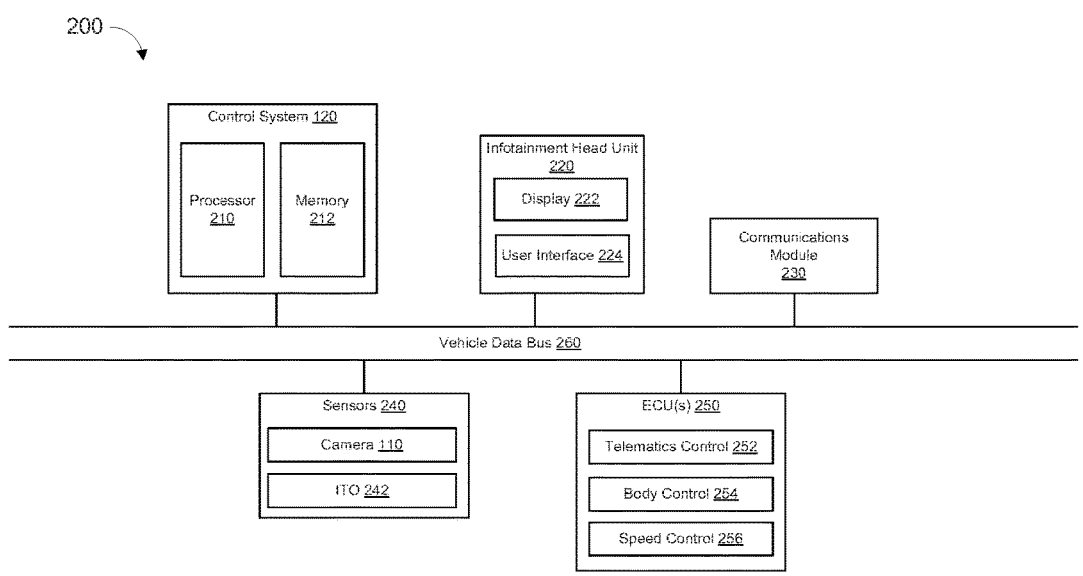
FIG. 2 illustrates an example block diagram of electronic components of the vehicle of FIG. 1.

FIG. 2 illustrates an example block diagram 200 showing electronic components of vehicle 100, according to some embodiments. In the illustrated example, the electronic components 200 include the control system 120, infotainment head unit 220, communications module 230, sensors 240, electronic control unit(s) 250, and vehicle data bus 260.

The control system 120 may include a microcontroller unit, controller or processor 210 and memory 212. The processor 210 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 212 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 212 includes multiple kinds of memory, particularly volatile memory and non-volatile memory.

The memory 212 may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 212, the computer readable medium, and/or within the processor 210 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 220 may provide an interface between vehicle 100 and a user. The infotainment head unit 220 may include one or more input and/or output devices, such as display 222, and user interface 224, to receive input from and display information for the user(s). The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), and/or speakers. In the illustrated example, the infotainment head unit 220 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). In some examples the infotainment head unit 220 may share a processor with control system 120. Additionally, the infotainment head unit 220 may display the infotainment system on, for example, a center console display of vehicle 100.

Communications module 230 may include wired or wireless network interfaces to enable communication with external networks. Communications module 230 may also include hardware (e.g., processors, memory, storage, etc.) and software to control the wired or wireless network interfaces. In the illustrated example, communications module 230 may include a Bluetooth module, a GPS receiver, a dedicated short range communication (DSRC) module, a WLAN module, and/or a cellular modem, all electrically coupled to one or more respective antennas.

The cellular modem may include controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); and Wireless Gigabit (IEEE 802.11ad), etc.). The WLAN module may include one or more controllers for wireless local area networks such as a Wi-FI® controller (including IEEE 802.11 a/b/g/n/ac or others), a Bluetooth® controller (based on the Bluetooth® Core Specification maintained by the Bluetooth Special Interest Group), and/or a ZigBee® controller (IEEE 802.15.4), and/or a Near Field Communication (NFC) controller, etc. Further, the internal and/or external network(s) may be public networks, such as the Internet; a private network, such as an intranet; or combinations thereof, and may utilize a variety of networking protocols now available or later developed including, but not limited to, TCP/IP-based networking protocols.

Communications module 230 may also include a wired or wireless interface to enable direct communication with an electronic device (such as a smart phone, a tablet computer, a laptop, etc.). An example DSRC module may include radio(s) and software to broadcast messages and to establish direct connections between vehicles. DSRC is a wireless communication protocol or system, mainly meant for transportation, operating in a 5.9 GHz spectrum band.

Sensors 240 may be arranged in and around the vehicle 100 in any suitable fashion. In the illustrated example, sensors 240 include camera 110 and ITO 242. ITO 242 may be electrically coupled to control system 120, such that control system 120 may receive/transmit signals and/or heat a lens of camera 110 via ITO 242. Other sensors may be included as well, such as a vehicle gear sensor, a humidity sensor, pressure sensor, or one or more other environmental sensors. The vehicle gear sensor may indicate what gear the vehicle is in (e.g., reverse, neutral, etc.). The environmental sensors may indicate the weather conditions surrounding the vehicle. One or more actions may be taken by the various systems and devices of vehicle 100 based on a determined gear and/or weather conditions. The various sensors of vehicle 100 may be analog, digital, or any other type, and may be coupled to one or more other systems and devices described herein.

The ECUs 250 may monitor and control subsystems of vehicle 100. ECUs 250 may communicate and exchange information via vehicle data bus 260. Additionally, ECUs 250 may communicate properties (such as, status of the ECU 250, sensor readings, control state, error and diagnostic codes, etc.) to and/or receive requests from other ECUs 250. Some vehicles 100 may have seventy or more ECUs 250 located in various locations around the vehicle 100 communicatively coupled by vehicle data bus 260. ECUs 250 may be discrete sets of electronics that include their own circuit(s) (such as integrated circuits, microprocessors, memory, storage, etc.) and firmware, sensors, actuators, and/or mounting hardware. In the illustrated example, ECUs 250 may include the telematics control unit 252, the body control unit 254, and the speed control unit 256.

The telematics control unit 252 may control tracking of the vehicle 100, for example, using data received by a GPS receiver, communication module 230, and/or one or more sensors. The body control unit 254 may control various subsystems of the vehicle 100. For example, the body control unit 254 may control power a trunk latch, windows, power locks, power moon roof control, an immobilizer system, and/or power mirrors, etc. The speed control unit 256 may transmit and receive one or more signals via data bus 260, and may responsively control a speed, acceleration, or other aspect of vehicle 100.

Vehicle data bus 260 may include one or more data buses that communicatively couple the control system 120, infotainment head unit 220, communications module 230, sensors 240, ECUs 250, and other devices or systems connected to the vehicle data bus 260. In some examples, vehicle data bus 260 may be implemented in accordance with the controller area network (CAN) bus protocol as defined by International Standards Organization (ISO) 11898-1. Alternatively, in some examples, vehicle data bus 250 may be a Media Oriented Systems Transport (MOST) bus, or a CAN flexible data (CAN-FD) bus (ISO 11898-7).

Figure 3:
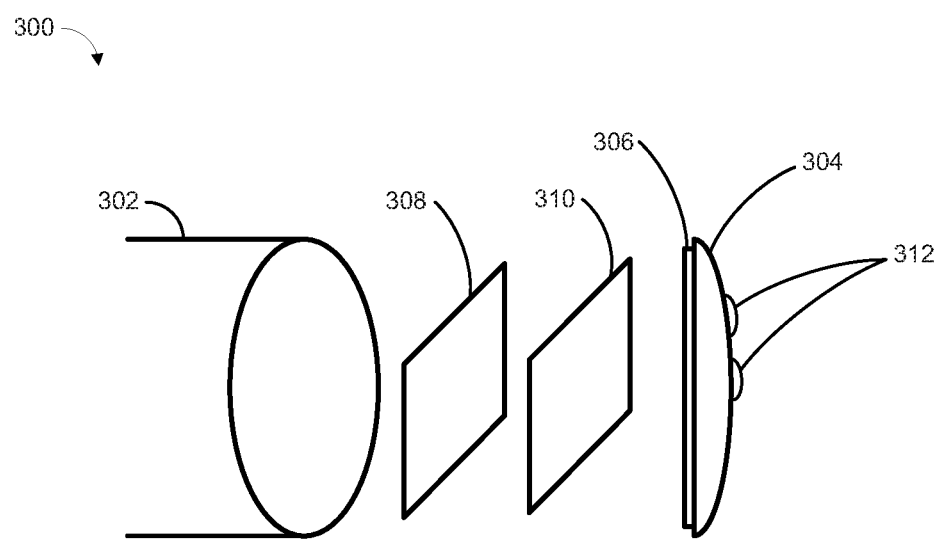
FIG. 3 illustrates an example exploded view of a rear view camera of a vehicle according to embodiments of the present disclosure.

FIG. 3 illustrates an exploded view of a vehicle camera 300 according to some embodiments. Camera 300 may include a housing 302 and a lens 304. Camera 300 may also include an image sensor 308, one or more filters 310, and an ITO coating on a surface of the lens 304. FIG. 3 also shows two water-based obstructions 312.

Housing 302 may be any shape or material configured to protect the components or parts of camera 300 from weather, dust or other environmental factors. FIG. 3 shows housing 302 as a cylinder.

Lens 304 may be any shape as well. Lens 304 is shown in a side perspective view as having a convex or dome-like shape. However lens 304 may be concave or flat, and/or may be square, rectangular, elliptical, or any other shape. Lens 304 may be formed from an optical grade hard silicone material. Further, lens 304 may be thin such that a finger touching or proximate to an outside surface of the lens can be detected by an ITO coating 306 applied to the inner surface.

ITO coating 306 may be applied to an inner surface of the lens 304, as shown in FIG. 3. The ITO coating 306 may be applied directly to the lens 304, or may be affixed with an adhesive, such as an optically clear adhesive. ITO coating 306 is described in more detail below with respect to FIG. 4.

ITO coating 306 may be electrically coupled to a control system. In some examples, ITO coating 306 may be configured to provide a signal to the control system. The signal may be a capacitance value, determined based on the geometry of the coating, voltage and/or current applied, and any obstructions or fingers present on the lens. In some examples the capacitance value may run from 0 counts on the low end (e.g., no obstruction or finger present) to around 6000 counts on the high end (e.g., where the lens is covered in ice). Varying values below 0, between 0 and 6000, and above 6000 counts may be used as well, depending again on the geometry, voltage and current applied, and many other factors.

FIG. 3 shows the ITO coating 306 applied to an inner surface of lens 304. In some examples, ITO coating 306 may be applied to one or more other components, and/or may have one or more components present between the lens and the coating.

The water-based obstructions 312 may be condensation, fog, water, snow, ice, or any other type of obstruction. As discussed further with respect to FIG. 4, ITO coating 306 may be configured to change a capacitance value based on the presence or absence of objects proximate the coating. In effect, ITO coating 306 may act as a proximity sensor, wherein a capacitance value may rise or fall based on changes to the environment surrounding the coating. As such, condensation, fog, rain, snow, ice, and/or any other obstruction of lens 304 may have different impacts on the signal coming from ITO coating 306. And this difference may be detected by a control system, so as to responsively take an appropriate action.

Figure 4:
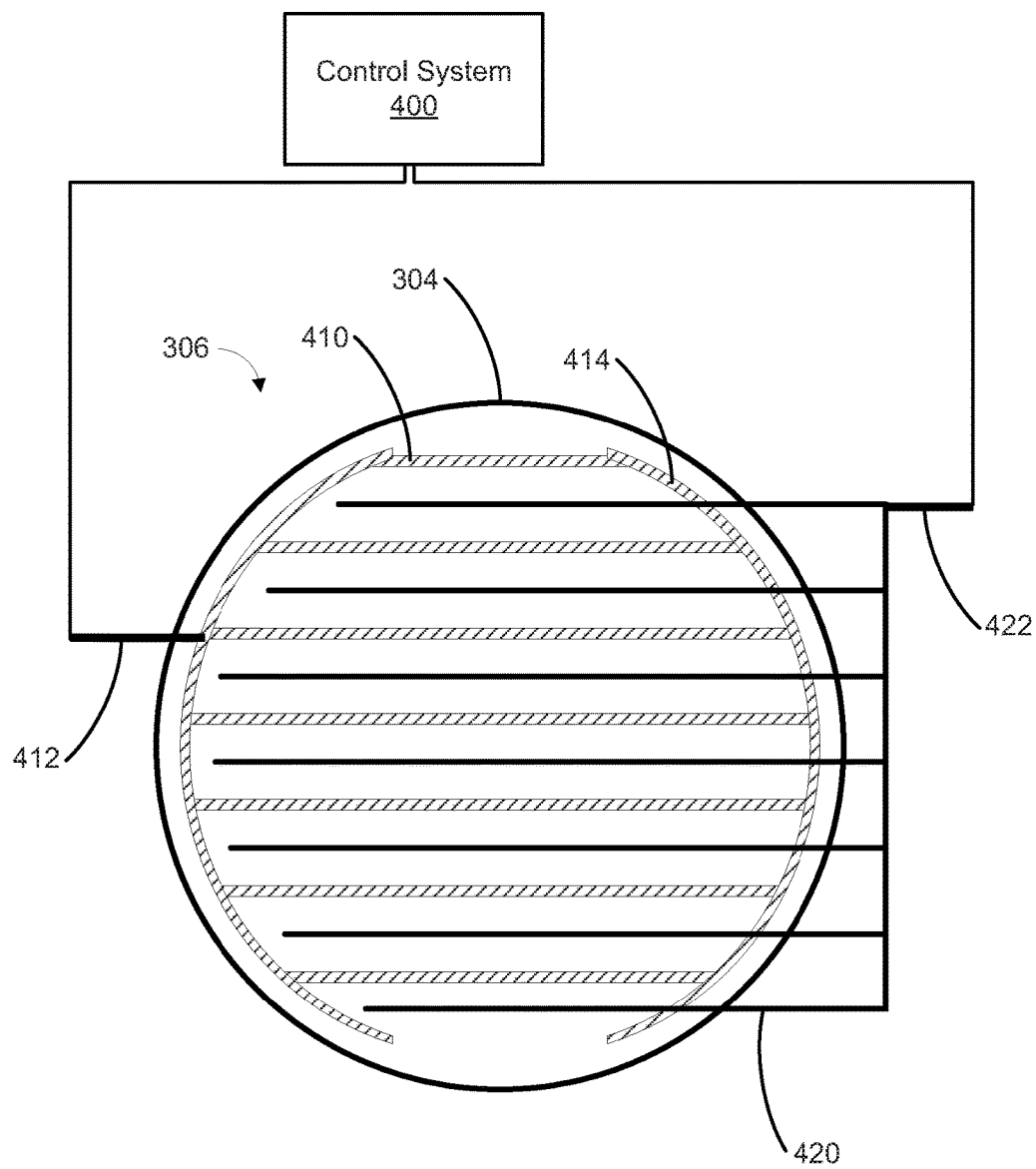
FIG. 4 illustrates a perspective view of a lens with an applied ITO coating according to embodiments of the present disclosure.

FIG. 4 illustrates a perspective view of lens 304 and ITO coating 306. ITO coating 306 may include a first electrode 410 and a second electrode 420. First electrode 410 may be electrically coupled to control system 400 via connection 412, and electrode 420 may be electrically coupled to control system 400 via connection 422. ITO coating 306 may also include a dielectric strip 414, such that electrode 420 does not make direct contact with electrode 410.

Examples disclosed herein are described with reference to an ITO coating. However in some examples, a clear conductive ink may be used instead or in addition. The clear conductive ink may function similarly or identically to the ITO coating.

Electrodes 410 and 420 may be thin films interlaced as shown in FIG. 4, or may be positioned in some other orientation or arrangement. In some examples, the area covered by electrodes 410 and 420 may correspond to an area of lens 204. As such, the covered area may be maximized. Alternatively, electrodes 410 and 420 may be positioned such that only part of lens 304 is covered. Further, electrodes 410 and 420 may extend beyond lens 306 such that part or all of electrodes are not applied to lens 306.

In some examples, the configuration of electrodes 410 and 420 may enable a signal to be detected by control system 400. For instance, as described above, the ITO coating may provide a capacitance signal or value. This signal may be detected by the control system 400, in addition to variations in the signal due to obstructions, touch events, and other interactions with lens 304 and/or ITO coating 306. The capacitance of the ITO coating 306 may be measured in farads, which may be converted to "counts" of capacitance.

In some examples, the signal may change depending on the type of obstruction present on or near lens 306. The example scenarios below may provide relative signal values for ITO coating 306 in the presence of a clear lens, a lens with condensation on it, a lens with ice on it, and where a user touches the lens in each case. The values included are for explanation only, and may change based on one or more factors.

A clear lens with no finger proximate the lens may result in a baseline signal of around 500 counts. This signal may be stable to within 40 counts, such that over a given period of time (e.g., 1 second) the signal does not change by more than 40 counts. When a finger is touched to the clear lens, the signal may change by 100-300 counts from the baseline. This change may reduce the signal from 500 to 300. Where the reduced signal is stable, control system 400 may determine that a touch event has occurred. A touch event may last for approximately 80-100 ms. As such, where the signal is stable for that time period, the touch event may be detected.

In some examples, the vehicle may be operating in a humid environment, which may cause the lens to experience fog, condensation, or other water on the lens. Where there is condensation or fog, the signal may be around 1000-6000 counts. Where water runs across the lens (e.g., rain or other water droplets), the signal may vary over time. As such, the signal may not be stable over time. In some examples, the signal may be stable on a time scale of around 1-2 seconds, but may vary greatly over a longer time period. In this scenario, a user may touch the lens and the control system may detect a touch event. For instance, the signal may momentarily decrease by 100-300 counts (for 80-100 ms). This reduction may be detected, and a touch event may be registered by control system 400. Control system 400 may responsively release the vehicle trunk latch.

In some examples, snow or ice may be present on the lens. In this case, the signal value may be around 6000 counts. In addition, where there is persistent snow or ice on the lens, the signal may be stable over a long period of time (i.e., multiple seconds or minutes). When a person touches the lens, the signal may momentarily decrease by 100-300 counts. As such, even where ice is present on the lens, the control system may still detect a touch event.

The scenarios described above (clear, condensation, ice, and touch event) may occur while control system 400 is in a first sensing state. In this state, control system 400 may receive the signal from ITO coating 306, and based on the value over time, may detect the water-based obstruction on the lens 304. To this end, control system 400 may have one or more determined thresholds, such that a stable signal below a first threshold indicates that the lens is clear. A stable signal above a second threshold may indicate that the lens is obstructed by snow or ice. And a stable or varying signal between the two thresholds may indicate that condensation, fog, or rain is present on the lens. Further, control system 400 may have one or more timing thresholds, such that a signal that changes less than a given amount over a threshold time period is considered "stable," while a signal that varies over that threshold time period is considered not stable.

In some examples, control system 400 be configured to detect a water-based obstruction on the lens based on the ITO signal by (i) determining that the ITO signal is above a threshold level, (ii) determining that the ITO signal is above the threshold level for a threshold period of time, and (iii) responsively determining that the ITO signal is stable. The various thresholds may be pre-set, or may be dynamically determined based on data received during initialization or operation.

As noted above, the signal value may change based on the type of obstruction on the lens. As such, control system 400 may detect a type of obstruction based on the signal (in addition to detection of an obstruction in general). And one or more actions may responsively be taken based on the determination of the type.

Control system 400 may also operate in a second state. The second state may be a "heating" or "obstruction removal" state, in which a current is passed through ITO coating 306 in order to heat lens 304. The heat may cause any water-based obstruction to melt, such that any ice or snow is removed, or any condensation, fog, or rain is cleared from the lens. Control system 400 may switch between states responsive to detection of one or more obstructions, touch events, or based on something else.

In some examples, control system 400 may operate in the first "sensing" state, and may detect an obstruction as well as a type of obstruction. Then based on the type of obstruction detected, control system 400 may switch to a second "heating" state, and may responsively heat the ITO coating. Further, a length of time for which control system 400 heats the ITO coating may depend on the type of obstruction. For instance, an ice detection may cause a longer heating time than a condensation detection.

In some examples, the functions or action available to control system 400 in one state may not be available in a second state. For instance, where control system 400 is in a first state in which it can sense touch events and obstructions, control system 400 may be prevented from running a current through the ITO coating for the purpose of heating the lens and removing the obstruction.

In some examples, control system 400 may operate with a particular duty cycle. For instance, control system 400 may operate in a first sensing state for 50 ms, and then a second heating state for 50 ms. In this manner, the control system may sense obstructions and/or touch events at regular intervals while heating the lens to remove the obstructions.

Control system 400 may be configured to operate even where a vehicle of which it is a part is turned off. For instance, a driver of a vehicle may park and enter a store. The control system 400 may remain on, and may detect and remove water-based obstructions on the lens. The control system may remain on for a set period of time (e.g., three hours), before it turns off to conserve energy. In this manner, when the driver returns to the vehicle, the rear camera may be clear from obstructions such that the driver can make use of the rear view images immediately. In some embodiments, the control system may turn on when the car turns on, so that it may quickly determine and remove any obstructions.

Figure 5:
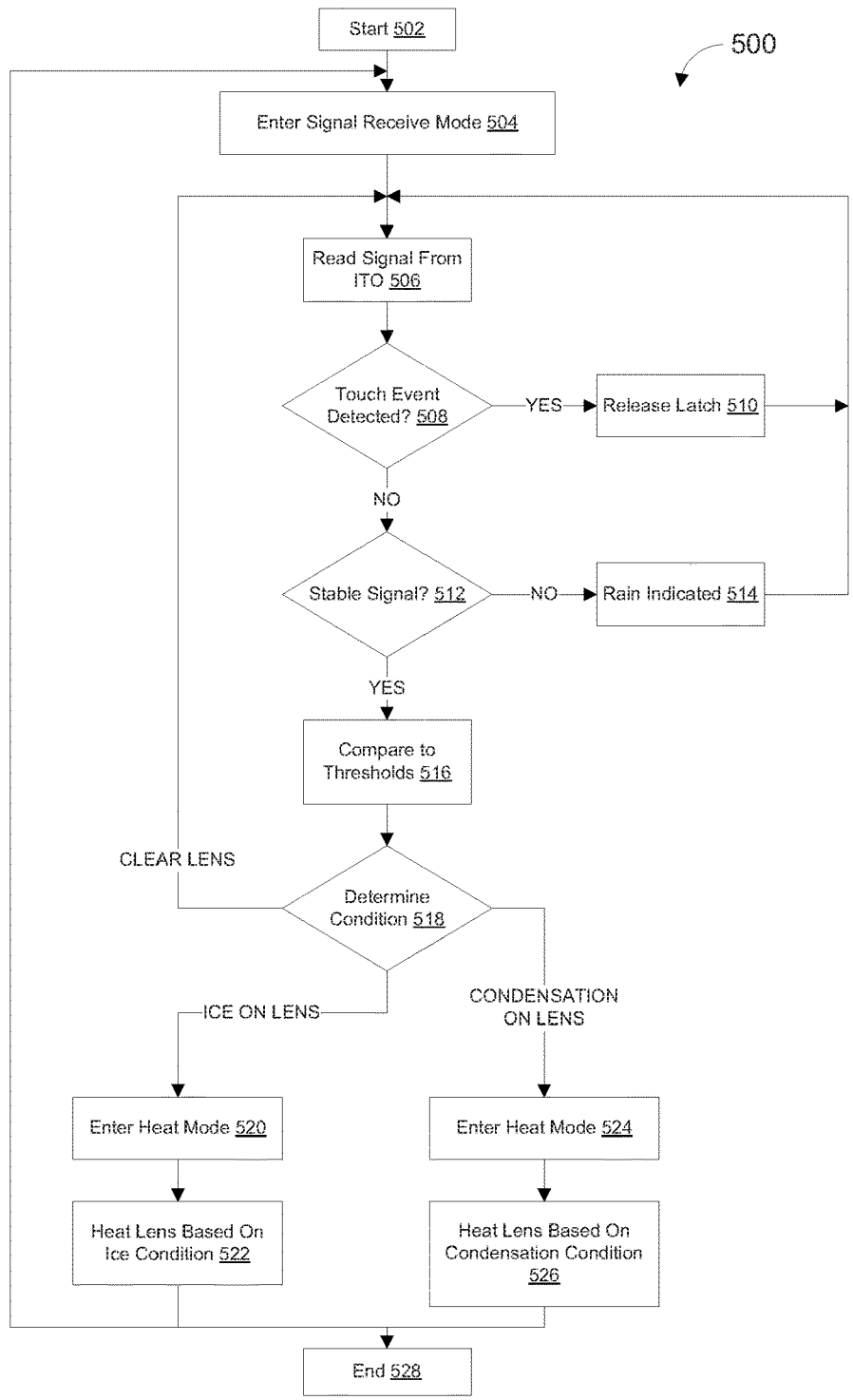
FIG. 5 illustrates a flowchart of an example method according to embodiments of the present disclosure.
Figure 6:
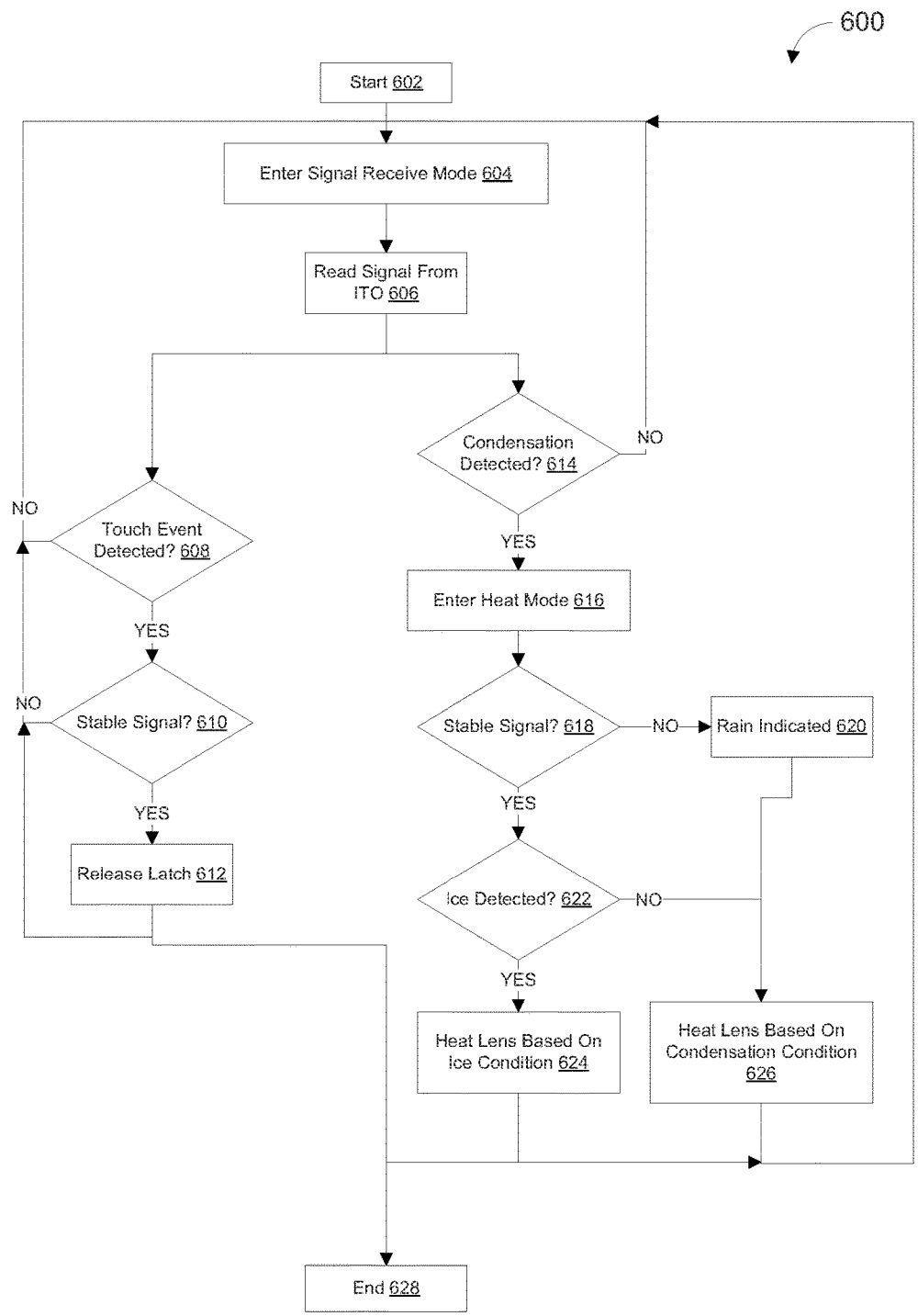
FIG. 6 illustrates a flowchart of an example method according to embodiments of the present disclosure.

FIGS. 5 and 6 illustrate flowcharts of example methods 500 and 600 according to embodiments of the present disclosure. Methods 500 and 600 may enable a vehicle system to detect and remove obstructions from a vehicle camera. The flowcharts of FIGS. 5 and 6 are representative of machine readable instructions that are stored in memory (such as memory 212) and may include one or more programs which, when executed by a processor (such as processor 210) may cause vehicle 100 and/or one or more systems or devices to carry out one or more functions described herein. While the example program is described with reference to the flowcharts illustrated in FIGS. 5 and 6, many other methods for carrying out the functions described herein may alternatively be used. For example, the order of execution of the blocks may be rearranged or performed in series or parallel with each other, blocks may be changed, eliminated, and/or combined to perform methods 500 and 600. Further, because methods 500 and 600 are disclosed in connection with the components of FIGS. 1-4, some functions of those components will not be described in detail below.

Method 500 may start at block 502. At block 504, the method may include entering a signal receive mode. This signal receive mode may be the first state described above, in which the control system can detect the presence of an obstruction, the type of obstruction, and/or a touch event.

At block 506, method 500 may include reading a signal from the ITO. And at block 508, method 500 may include determining whether a touch even has been detected. This determination may be done by the control system. As noted above, a touch event may be detected when the ITO signal changes by a particular amount for a period of time. For instance, 100-300 counts for 80-100 ms. Other thresholds and amounts can be used as well.

If a touch event is detects, method 500 may include releasing the vehicle trunk latch at block 510. Method 500 may then return to block 506.

However if a touch even is not detected, method 500 may include determining whether the signal is stable. This may include determining that the signal does not change by more than a given amount over a period of time. For instance, determining that the signal does not change by more than 40 counts over a period of 10 seconds. If the signal is not stable, method 500 may proceed to block 514, which may indicate that rain or other water is present on the lens. The droplets may run down the lens, causing the signal to fluctuate greatly over a short period of time. Method 500 may then proceed back to block 506.

If the signal is determined to be stable at block 512, method 500 may include proceeding to block 516 in which the signal is compared to one or more thresholds. The signal may be compared in both absolute and relative value, as well as for particular periods of time. The thresholds may be set based on expected values for condensation, snow, ice, and other obstructions on the lens.

At block 518, method 500 may include determining the condition. The condition may be based on the ITO signal and the thresholds. For instance, if the signal indicates that the lens is clear, method 500 may proceed back to block 506.

However if the signal indicates that there is Ice on the lens, method 500 may proceed to block 520 in which the system enters a heat mode. The heat mode may be the second mode described above, and entering this mode may prevent the control system from receiving signals from the ITO coating. At block 522, method 500 may include passing current through the ITO coating to heat the lens. Where ice is detected, block 522 may include heating the lens for a given period of time, such as 3 minutes. Further, the amount of current passed through the ITO coating may be based on the type of obstruction detected. Other time periods are possible as well.

If at block 518 it is determined that there is condensation on the lens, method 500 may include entering heat mode at block 524. Block 524 may be similar or identical to block 520. Alternatively, block 524 may include different limits on current and time for which the lens can be heated.

At block 526, method 500 may include heating the lens based on the condensation condition. This may mean that current is passed through the ITO coating for a second period of time (e.g., 2 minutes) which may be different from the time period used in block 522.

After heating the lens to remove the obstruction in blocks 522 and/or 526, method 500 may proceed to block 504, in which the control system enters the first state or signal receive mode. As such, the process may continue and further obstructions and touch events may be detected. Alternatively, method 500 may end at block 528.

FIG. 6 illustrates a flowchart of a second example method 600. Blocks of FIG. 6 may be similar or identical to those described with respect to FIG. 5.

Method 600 may start at block 602. Blocks 604 and 606 may include entering a signal receive mode, and reading a signal from the ITO, which may be similar or identical to blocks 504 and 506.

Method 600 may include two loops running in parallel, a first loop including blocks 608, 610, and 612. The blocks of the first loop may be similar or identical to blocks 508, 512, and 510 respectively. In this manner, the first loop may detect a touch event, determine that the signal is stable, and responsively release a latch.

In parallel with the first loop, a second loop may run. At block 614, method 600 may include detecting condensation. This may include comparing the ITO signal to a threshold for condensation, and determining that the ITO signal is above the threshold. Method 600 may then enter heat mode at block 616. Method 600 may then include determining whether the signal is stable at block 618. If the signal is not stable, that may indicate that rain is present on the lens (block 620).

If the signal is stable, method 600 may include determining whether there is ice on the lens at block 622. If there is ice, method 600 may include heating the lens based on an ice condition at block 624. However if there is not ice, or if rain is indicated at block 620, method 600 may include heating the lens based on a condensation condition at block 626. The lens heating may occur for a different time, temperatures, or other characteristic based on the determined condition (ice, condensation, or other condition.). Method 600 may then return back to block 604, or end at block 628.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a rear view camera having a lens;
   an indium-tin-oxide (ITO) coating applied to the lens and configured to provide an ITO signal to a control system; and
   the control system configured to:
     detect a water-based obstruction on the lens based on the ITO signal;
     run current through the ITO coating to remove the water-based obstruction;
     detect a lens touch event; and
     release a vehicle trunk latch responsive to the lens touch event.

2. The vehicle of claim 1, wherein the ITO coating is on an inside surface of the lens.

3. The vehicle of claim 1, wherein a shape of the ITO coating corresponds to a shape of the lens.

4. The vehicle of claim 1, wherein the control system is further configured to operate in two states, such that a first state enables the control system to (i) detect the water-based obstruction the lens and (ii) detect the lens touch event, and a second state enables the control system to run current through the ITO coating to remove the water-based obstruction.

5. The vehicle of claim 4, wherein the control system operating in the first state prevents the control system from running current through the ITO coating to remove the water-based obstruction.

6. The vehicle of claim 1, wherein the control system is configured to detect the water-based obstruction on the lens based on the ITO signal by:
   determining that the ITO signal is above a threshold level;
   determining that the ITO signal is above the threshold level for a threshold period of time; and
   determining that the ITO signal is stable.

7. A vehicle comprising:
   a rear view camera having a lens;
   an indium-tin-oxide (ITO) coating applied to the lens; and
   a control system configured to:
     detect a water-based obstruction on the lens and a type of water-based obstruction detected;
     run current through the ITO coating to remove the water-based obstruction;
     detect a lens touch event; and
     release a vehicle trunk latch responsive to the lens touch event.

8. The vehicle of claim 7, wherein the type of water-based obstruction comprises ice or condensation.

9. The vehicle of claim 7, wherein the control system is further configured to run current through the ITO coating to remove the water-based obstruction for a first period of time based on a first type of water-based obstruction, and a second period of time based on a second type of water-based obstruction.

10. The vehicle of claim 1, wherein the control system is configured to detect the lens touch event based on the ITO signal.

11. The vehicle of claim 10, wherein the control system is configured to detect the water-based obstruction on the lens and run current through the ITO coating to remove the water-based obstruction while an engine of the vehicle is off.

12. A method performed by a vehicle control system comprising:
   detecting, on a lens of a rear view camera of a vehicle, a water-based obstruction and a type of water-based obstruction;
   running current through an indium-tin-oxide (ITO) coating applied to the lens to remove the water-based obstruction;
   detecting, via the ITO coating, a lens touch event; and
   releasing a vehicle trunk latch responsive to detecting the lens touch event.

13. The method of claim 12, further comprising:
   determining a state of the control system performing the method, wherein a first state comprises (i) detecting the water-based obstruction on the lens of the rear view camera of the vehicle and (ii) detecting the lens touch event, and wherein a second state comprises running current through the ITO coating.

14. The method of claim 13, wherein the first state further comprises preventing the control system from running current through the ITO coating to remove the water-based obstruction.

15. The method of claim 12, wherein the type of water-based obstruction comprises ice or condensation.

16. The method of claim 12, further comprising:
   running current through the ITO coating to remove the water-based obstruction for a first period of time based on a first type of water-based obstruction; and
   running current through the ITO coating to remove the water-based obstruction for a second period of time based on a second type of water-based obstruction.

* * * * *